(12) United States Patent
Iwakura et al.

(10) Patent No.: US 12,472,889 B2
(45) Date of Patent: Nov. 18, 2025

(54) ELECTRIC WIRE HOLDER

(71) Applicant: Yazaki Corporation, Tokyo (JP)

(72) Inventors: Kouki Iwakura, Makinohara (JP); Toshikazu Yoshioka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/611,140

(22) Filed: Mar. 20, 2024

(65) Prior Publication Data

US 2024/0351533 A1 Oct. 24, 2024

(30) Foreign Application Priority Data

Apr. 19, 2023 (JP) ................................. 2023-068555

(51) Int. Cl.
*B60R 16/02* (2006.01)
(52) U.S. Cl.
CPC ................................. *B60R 16/0215* (2013.01)
(58) Field of Classification Search
CPC ................................................. B60R 16/0215
USPC ....................................................... 248/68.1
See application file for complete search history.

(56) References Cited

U.S. PATENT DOCUMENTS

| | | | | |
|---|---|---|---|---|
| 5,545,854 A * | 8/1996 | Ishida | ................ | H02G 3/081 16/2.2 |
| 5,794,897 A * | 8/1998 | Jobin | ................ | H02G 7/053 248/68.1 |
| 6,079,673 A * | 6/2000 | Cox | ................ | F16L 3/1041 174/40 R |
| 6,783,101 B2 * | 8/2004 | Knotts | ................ | F16L 3/2235 248/74.1 |
| 7,464,966 B2 * | 12/2008 | Miyajima | ................ | B60R 16/0222 248/56 |
| 8,074,945 B2 * | 12/2011 | Schoenau | ................ | F16L 5/14 248/65 |
| 12,048,991 B2 * | 7/2024 | de Lint | ................ | B25B 5/163 |
| 2024/0235104 A1 | 7/2024 | Hayashi et al. | | |

FOREIGN PATENT DOCUMENTS

| | | |
|---|---|---|
| JP | 2021-140984 A | 9/2021 |
| JP | 2022-107260 A | 7/2022 |

* cited by examiner

*Primary Examiner* — Anita M King
(74) *Attorney, Agent, or Firm* — Sughrue Mion, PLLC

(57) ABSTRACT

An electric wire holder is configured to be attached to the end portion of a tubular-shaped connector housing through which a plurality of electric wires are inserted to support the plurality of electric wires and includes a first insertion portion in a C shape including two member including a plurality of tubular-shaped electric wire insertion portions through which the plurality of electric wires is inserted and capable of sandwiching the plurality of electric wires, each of the plurality of electric wire insertion portions being provided only on a member of the two members, a second insertion portion in a C shape provided on the other member of the two members, and a lock portion configured to combine the first insertion portion and the second insertion portion, wherein the lock portion includes a lock piece protruding from one of the first insertion portion and the second insertion portion to another thereof and a lock receiving-portion provided on the other of the first insertion portion and the second insertion portion to lock the lock piece immovably in a direction in which the electric wires extend.

1 Claim, 5 Drawing Sheets

ELECTRIC WIRE HOLDER

TECHNICAL FIELD

The present invention relates to an electric wire holder.

BACKGROUND

Automobiles are equipped with a wide variety of electronic devices, and wire harnesses are routed to transmit power, control signals, and the like to the electronic devices. A wire harness includes a plurality of electric wires and a connector, and when this connector is fitted into a connector of an electronic device or another wire harness, the wire harness is connected to the electronic device or the another wire harness. As a connector used for such a wire harness, Patent Document 1 discloses a connector including a connector housing accommodating terminals connected to ends of electric wires and a rear holder inserted into the connector housing to support the electric wires.

The conventional connector disclosed in the Patent Document 1 includes the connector housing accommodating terminals connected to the ends of the electric wires and the rear holder inserted into the connector housing. The rear holder is constituted by a pair of split bodies that are combined with the electric wires in between. Each of the split bodies is provided with lock portions configured to make locking in the combined state in which the split bodies are combined with the electric wires between them. The lock portion includes a lock protrusion in an L shape provided on one of the pair of split bodies, and a lock recessed portion in an inverted L-shape provided on the other to lock to the lock protrusion. The lock protrusion and the lock recessed portion are locked by bringing the pair of split bodies close to each other along the length direction (longitudinal direction) of the electric wires, and inserting the lock protrusion into the lock recessed portion. When the rear holder in the combined state is attached to the connector housing, a connector is completed by bringing the rear holder close to the connector housing and inserting it into the connector housing.

RELATED ART

Patent Document

Patent Document 1: JP 2022-107260 A

SUMMARY OF THE INVENTION

Problem to be Solved by the Invention

However, if a local load is applied to only one of the pair of split bodies while the rear holder of the conventional connector is in the combined state, the pair of split bodies may be displaced relative to each other in the longitudinal direction so that only one of them is attached to the connector housing.

It is an object of the present invention to provide an electric wire holder with an improved ease of attachment to the connector housing.

Solution to Problem

In order to solve the above problem and achieve the object, an electric wire holder according to the present invention is an electric wire holder configured to be attached to an end portion of a tubular-shaped connector housing through which at least one electric wire is inserted to support the electric wire, wherein the electric wire holder includes two members including a tubular-shaped electric wire insertion portion through which the electric wire is inserted, the two members being capable of sandwiching the electric wire, the electric wire insertion portion includes: a first insertion portion in a C shape provided on one of the two members; a second insertion portion in a C shape provided on the other of the two members; and a lock portion configured to attach the first insertion portion and the second insertion portion to each other, the lock portion includes: a lock piece protruding from one of the first insertion portion and the second insertion portion to the other of the first insertion portion and the second insertion portion; and a lock receiving-portion provided on the other of the first insertion portion and the second insertion portion to lock the lock piece immovably in a direction in which the electric wire extends.

Advantageous Effects of the Invention

According to the present invention, the ease of attachment to the connector housing can be improved.

DETAILED DESCRIPTION OF THE EXEMPLARY EMBODIMENT

Figure 1:
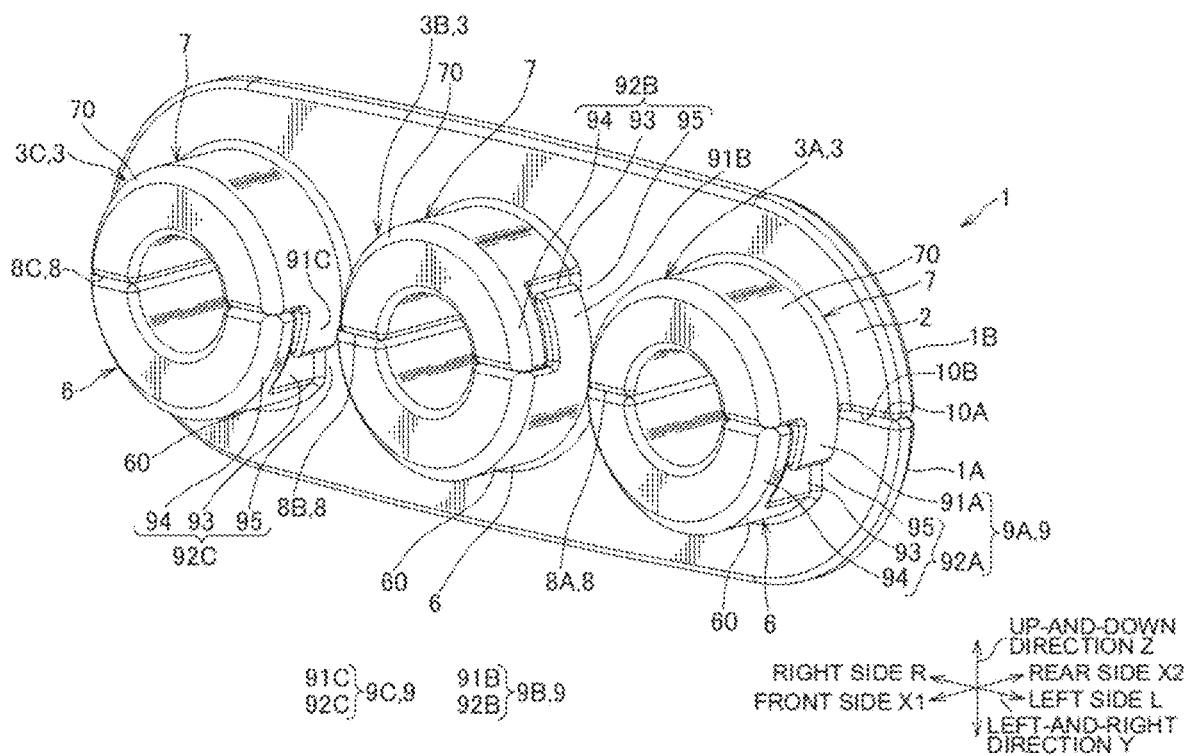
FIG. 1 is a perspective view illustrating a rear holder as an electric wire holder according to an embodiment of the present invention.
Figure 2:
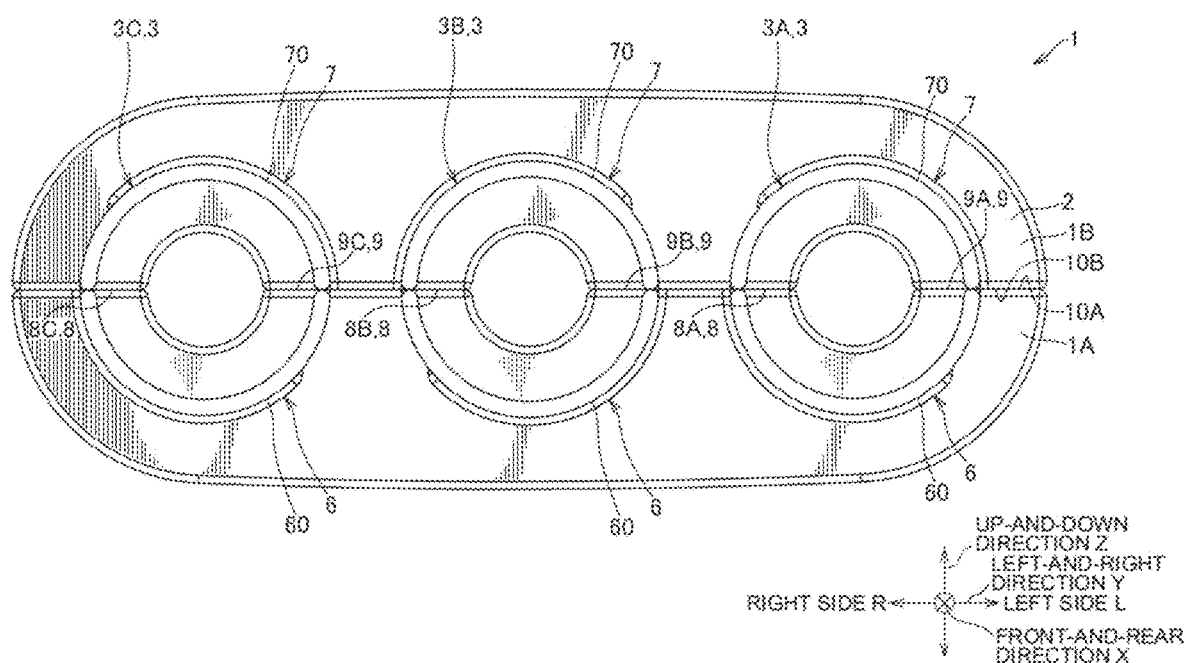
FIG. 2 is a plan view of the rear holder as seen from the front.

An embodiment of the present invention is described below with reference to FIGS. 1 to 5. FIG. 1 is a perspective view illustrating a rear holder I (electric wire holder) according to an embodiment of the present invention. FIG. 2 is a plan view of the rear holder 1 as seen from the front. The rear holder I according to the present embodiment is attached to the rear end (end) of a connector housing in a tubular shape (not illustrated) through which three (multiple) electric wires 11 are inserted to support the three electric wires 11. This rear holder I constitutes a connector.

Hereinafter, a direction in which the two members 1A, 1B that make up the rear holder 1 approach each other may be referred to as an "up-and-down direction Z", a direction in which the three electric wire insertion portions 3A, 3B, and 3C are lined up may be referred to as a "left-and-right direction Y", and a direction in which the electric wires 11 extend may be referred to as a "longitudinal direction X". In the "longitudinal direction X" illustrated in FIGS. 2 and 4, a front side in the direction perpendicular to the page may be referred to as a "front side X1," and a side in the opposite direction may be referred to as a "backward X2".

As illustrated in FIGS. 1, 2, the rear holder 1 includes a base 2 in a plate shape formed in a track shape in a plan view and three electric wire insertion portions 3A, 3B, 3C (which may be hereinafter attached with a reference numeral 3) extending in a tubular shape from the base 2 to the front side X1 to support the electric wires 11.

Figure 3:
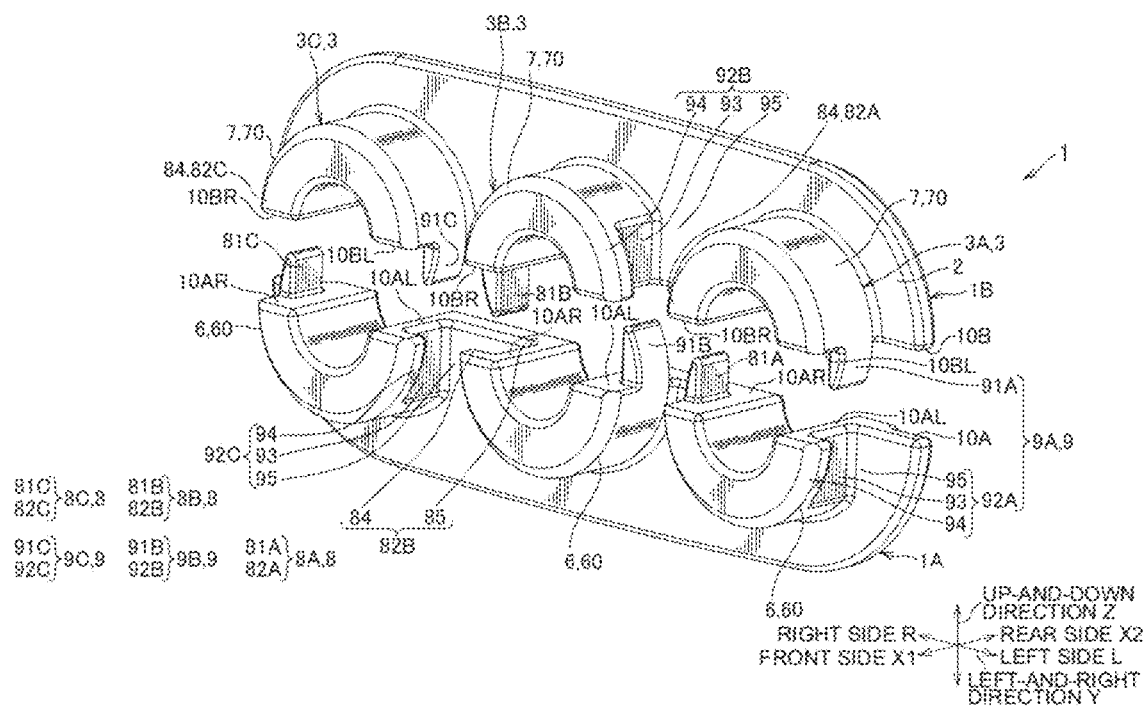
FIG. 3 is a perspective view for explaining how two members that make up the rear holder are attached to each other.

As illustrated in FIG. 3, the three electric wire insertion portions 3A, 3B, 3C (3) are arranged in the left-and-right direction Y. Each electric wire insertion portion 3 includes a lower side insertion portion 6 (first insertion portion) in a C shape concavely formed on the lower side split surface 10A of the lower member 1A explained later, an upper side insertion portion 7 (second insertion portion) in a C shape concavely formed on the upper side split surface 10B of the member 1B explained later, and a pair of lock portions 8, 9 for attaching the lower side insertion portion 6 and the upper side insertion portion 7 to each other.

Among the three electric wire insertion portions 3A, 3B, 3C (3), an electric wire insertion portion 3 situated at one end in the left-and-right direction Y may be referred to as a "first electric wire insertion portion 3A", an electric wire insertion portion 3 situated at the other end thereof may be referred to as a "third electric wire insertion portion 3C", and an electric wire insertion portion 3 situated between the first electric wire insertion portion 3A and the third electric wire insertion portion 3C may be referred to as a "second electric wire insertion portion 3B". Hereinafter, the first electric wire insertion portion 3A is explained as an example of an electric wire insertion portion 3.

In this case, as illustrated in FIG. 3, the rear holder 1 includes the two members 1A, 1B that have split surfaces 10A, 10B formed to divide each electric wire insertion portion 3 into two parts in the up-and-down direction. Hereinafter, one of the two members constituting the rear holder 1 may be referred to as a "lower member 1A", and the other thereof may be referred to as an "upper member 1B". A split surface of the lower member 1A (which may be hereinafter referred to as a "lower side split surface 10A") and a split surface of the upper member 1B (which may be hereinafter referred to as an "upper side split surface 10B") are constituted by a flat surface perpendicular to the up-and-down direction Z. Such a rear holder 1 is configured such that the lower member 1A and the upper member 1B come close to each other in the up-and-down direction Z so that the lower side split surface 10A and the upper side split surface 10B come into contact with each other.

As illustrated in FIG. 3, the lower side insertion portion 6 includes a lower side insertion portion body 60 formed in a semicircular tubular shape. Hereinafter, a split surface that is part of the lower side split surface 10A and that is situated on the right-side R of the lower side insertion portion body 60 may be referred to as a "lower right-side split surface 10AR", and a split surface on the left-side L may be referred to as a "lower left-side split surface 10AL".

As illustrated in FIG. 3, the upper side insertion portion 7 includes an upper side insertion portion body 70 formed in a semicircular tubular shape. Hereinafter, a split surface that is part of the upper side split surface 10B and that is situated on the right-side R of the upper side insertion portion body 70 may be referred to as an "upper right-side split surface 10BR", and a split surface on the left-side L may be referred to as an "upper left-side split surface 10BL".

As illustrated in FIG. 3, the first electric wire insertion portion 3A is provided with a pair of first lock portions 8A (8), 9A (9) (lock portions). One of the pair of first lock portions 8A, 9A may be referred to as a first right-side lock portion 8A, and the other thereof may be referred to as a first left-side lock portion 9A.

As illustrated in FIG. 3, the first right-side lock portion 8A includes a right-side lock piece 81A and a right-side lock receiving-portion 82A that locks the right-side lock piece 81A immovably in the longitudinal direction X. The right-side lock piece 81A is provided on the lower right-side split surface 10AR, and the right-side lock receiving-portion 82A is provided on the upper right-side split surface 10BR.

As illustrated in FIG. 3, the right-side lock piece 81A is provided, protruding in a plate shape, on the lower side insertion portion body 60 in an extending manner from the lower right-side split surface 10AR. This right-side lock piece 81A is formed with a plate thickness decreasing toward the tip.

As illustrated in FIG. 3, the right-side lock receiving-portion 82A includes a right-side contact surface, not illustrated, on which the right-side lock piece 81A comes into contact, a first front side overhang portion 84 formed to extend from the front end of the upper side contact surface 73 to the right-side R, and a first rear side overhang portion 85 formed to extend from the rear end of the right-side contact surface to the right-side R so as to face the rear side X2 of the first front side overhang portion 84. The first rear side overhang portion 85 is constituted by a portion of the base 2.

The right-side contact surface is formed by cutting out a portion of the upper right-side split surface 10BR of the upper side insertion portion body 70. In other words, the right-side lock receiving-portion 82A is provided on the upper right-side split surface 10BR. The first front side overhang portion 84 and the first rear side overhang portion 85 are provided to face in the longitudinal direction X, and are configured to allow the right-side lock piece 81A to enter between them. In the present embodiment, a state in which the right-side lock piece 81A is in contact with the right-side contact surface and is situated between the first front side overhang portion 84 and the first rear side overhang portion 85 and in which the right-side lock piece 81A is immovable in the longitudinal direction X is expressed as "the right-side lock receiving-portion 82A locks the right-side the right-side lock piece 81A in an immovable manner".

As illustrated in FIG. 3, the first left-side lock portion 9A includes a left-side lock piece 91A and a left-side lock receiving-portion 92A that locks the left-side lock piece 91A immovably in the longitudinal direction X. The left-side lock piece 91A is provided on the upper left-side split surface 10BL, and the left-side lock receiving-portion 92A is provided on the lower left-side split surface 10AL.

As illustrated in FIG. 3, the left-side lock piece 91A is provided, protruding in a plate shape, on the upper side insertion portion body 70 in an extending manner from the upper left-side split surface 10BL. This left-side lock piece 91A is formed with a plate thickness decreasing toward the tip.

As illustrated in FIG. 3, the left-side lock receiving-portion 92A includes a left-side contact surface 93 on which the left-side lock piece 91A comes into contact, a second front side overhang portion 94 formed to extend from the front end of the left-side contact surface 93 to the left-side L, and a second rear side overhang portion 95 formed to extend from the rear end of the left-side contact surface 93 to the left-side L so as to face the rear side X2 of the second front side overhang portion 94. The second rear side overhang portion 95 is constituted by a portion of the base 2.

The left-side contact surface 93 is formed by cutting out a portion of the lower right-side split surface 10AR of the lower side insertion portion body 60. In other words, the left-side lock receiving-portion 92A is provided on the lower right-side split surface 10AR. The second front side overhang portion 94 and the second rear side overhang portion 95 are provided to face in the longitudinal direction X, and are configured to allow the left-side lock piece 91A to enter between them. In the present embodiment, a state in which the left-side lock piece 91A is in contact with the left-side contact surface 93 and is situated between the second front side overhang portion 94 and the second rear side overhang portion 95 and in which the left-side lock piece 91A is immovable in the longitudinal direction X is expressed as "the left-side lock receiving-portion 92A locks the left-side lock piece 91A in an immovable manner".

As described above, the first right-side lock portion 8A (one of the pair of lock portions) is such that the right-side lock piece 81A (lock piece) is provided on the lower side insertion portion 6 (first insertion portion), and the right-side lock receiving-portion 82A (lock receiving-portion) is provided on the upper side insertion portion 7 (second insertion portion). The first left-side lock portion 9A (the other of the pair of lock portions) is such that the left-side lock piece 91A (lock piece) is provided on the upper side insertion portion 7, and the left-side lock receiving-portion 92A (lock receiving-portion) is provided on the lower side insertion portion 6.

Figure 4:
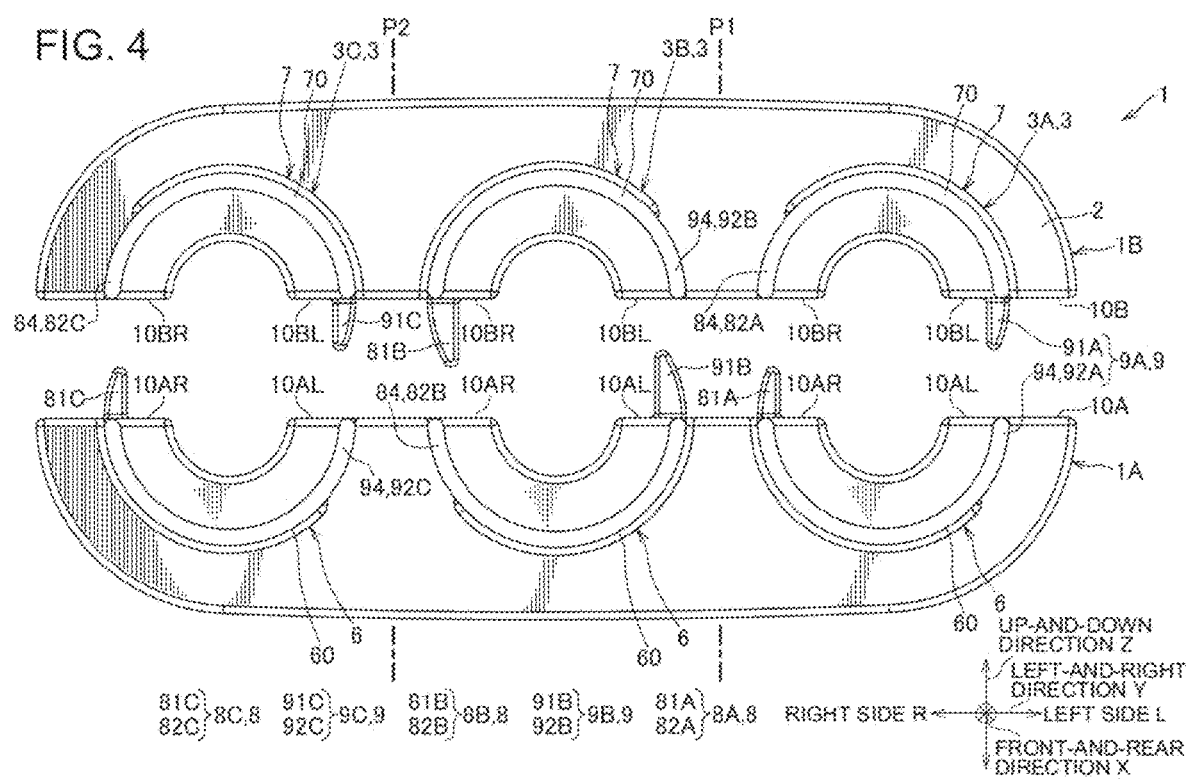
FIG. 4 is a plan view illustrating the rear holder illustrated in FIG. 3, as seen from the front.

As illustrated in FIGS. 3, 4, the second electric wire insertion portion 3B is provided with a pair of second lock portions 8B (8), 9B (9) (lock portions). One of the pair of second lock portions 8B, 9B may be referred to as a second right-side lock portion 8B, and the other thereof may be referred to as a second left-side lock portion 9B.

The second right-side lock portion 8B includes a right-side lock piece 81B and a right-side lock receiving-portion 82B that locks the right-side lock piece 81B immovably in the longitudinal direction X. The right-side lock piece 81B is provided on the upper right-side split surface 10BR, and the right-side lock receiving-portion 82B is provided on the lower right-side split surface 10AR.

The second left-side lock portion 9B includes a left-side lock piece 91B and a left-side lock receiving-portion 92B that locks the left-side lock piece 91B immovably in the longitudinal direction X. The left-side lock piece 91B is provided on the lower left-side split surface 10AL, and the left-side lock receiving-portion 92B is provided on the upper left-side split surface 10BL.

As described above, the second right-side lock portion 8B (one of the pair of lock portions) is such that the right-side lock piece 81B (lock piece) is provided on the upper side insertion portion 7 (second insertion portion), and the right-side lock receiving-portion 82B (lock receiving-portion) is provided on the lower side insertion portion 6 (first insertion portion). The second left-side lock portion 9B (the other of the pair of lock portions) is such that the left-side lock piece 91B (lock piece) is provided on the lower side insertion portion 6, and the left-side lock receiving-portion 92B (lock receiving-portion) is provided on the upper side insertion portion 7.

As illustrated in FIG. 3, 4, the third electric wire insertion portion 3C is provided on a pair of third lock portions 8C (8), 9C (9) (lock portions). One of the pair of third lock portions 8C, 9C may be referred to as a third right-side lock portion 8C, and the other thereof may be referred to as a third left-side lock portion 9C.

The third right-side lock portion 8C includes a right-side lock piece 81C and a right-side lock receiving-portion 82C that locks the right-side lock piece 81C immovably in the longitudinal direction X. The right-side lock piece 81C is provided on the lower right-side split surface 10AR, and the right-side lock receiving-portion 82C is provided on the upper right-side split surface 10BR.

The third left-side lock portion 9C includes a left-side lock piece 91C and a left-side lock receiving-portion 92C that locks the left-side lock piece 91C immovably in the longitudinal direction X. The left-side lock piece 91C is provided on the upper left-side split surface 10BL, and the left-side lock receiving-portion 92C is provided on the lower left-side split surface 10AL.

As described above, the third right-side lock portion 8C (one of the pair of lock portions) is such that the right-side lock piece 81C (lock piece) is provided on the lower side insertion portion 6 (first insertion portion), and the right-side lock receiving-portion 82C (lock receiving-portion) is provided on the upper side insertion portion 7 (second insertion portion). The third left-side lock portion 9C (the other of the pair of lock portions) is such that the left-side lock piece 91C (lock piece) is provided on the upper side insertion portion 7, and the left-side lock receiving-portion 92C (lock receiving-portion) is provided on the lower side insertion portion 6.

Specifically, as illustrated in FIG. 4, in the first electric wire insertion portion 3A and the second electric wire insertion portion 3B (electric wire insertion portions adjacent to each other), the lock pieces 81A, 91B provided on the lower side insertion portions 6 adjacent to each other and the lock receiving-portions 82A, 92B provided on the upper side insertion portions 7 adjacent to each other are provided in a reversed manner with respect to an axis P1 that is the up-and-down direction Z (direction in which the first insertion portion and the second insertion portion attach to each other) (in other words, the lock pieces together make a set, and the lock receiving-portions together make a set). The lock receiving-portions 92A, 82B provided on the lower side insertion portions 6 adjacent to each other and the lock pieces 91A, 81B provided on the upper side insertion portions 7 adjacent to each other are provided in a reversed manner with respect to the axis P1 that is the up-and-down direction Z (in other words, the lock pieces together make a set, and the lock receiving-portions together make a set).

In the second electric wire insertion portion 3B and the third electric wire insertion portion 3C (electric wire insertion portions adjacent to each other), the lock receiving-portions 82B, 92C provided on the lower side insertion portions 6 adjacent to each other and the lock pieces 81B, 91C provided on the upper side insertion portions 7 adjacent to each other are provided in a reversed manner with respect to an axis P2 that is the up-and-down direction Z (direction in which the first insertion portion and the second insertion portion attach to each other) (in other words, the lock pieces together make a set, and the lock receiving-portions together make a set). The lock pieces 91B, 81C provided on the lower side insertion portions 6 adjacent to each other and the lock receiving-portions 92B, 82C provided on the upper side insertion portions 7 adjacent to each other are provided in a reversed manner with respect to the axis P2 that is the up-and-down direction Z (in other words, the lock pieces together make a set, and the lock receiving-portions together make a set).

Figure 5:
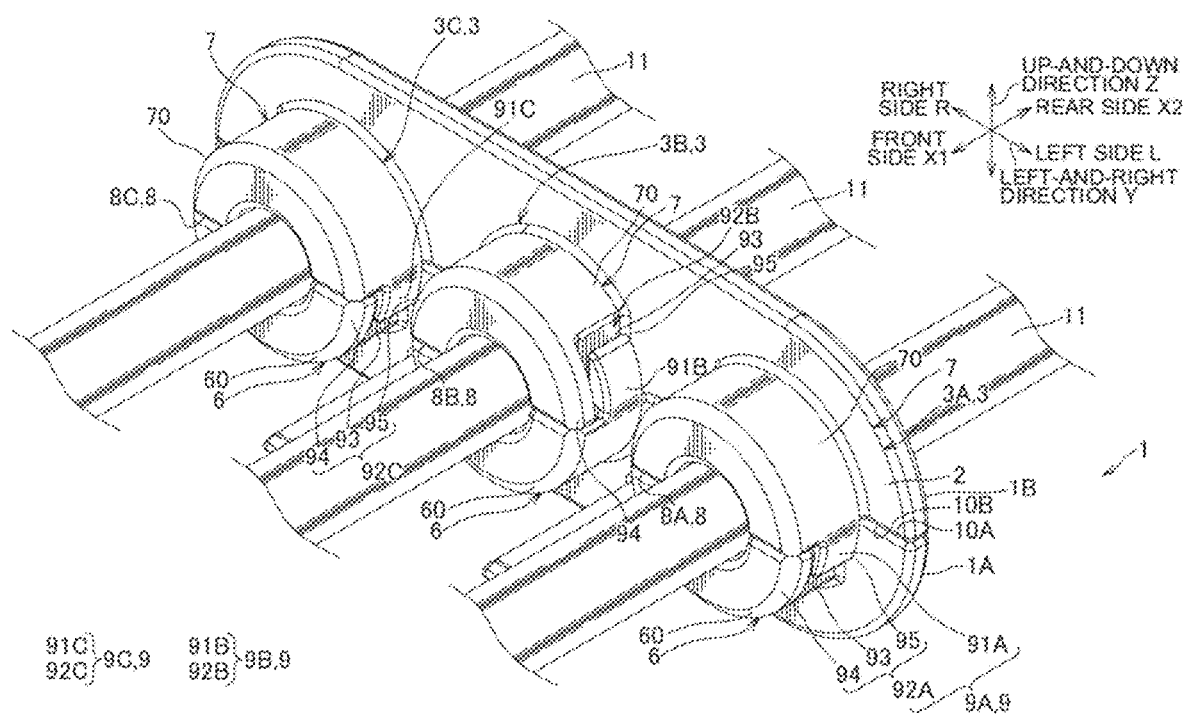
FIG. 5 is a perspective view illustrating a state in which electric wires are sandwiched between the two members.

When the rear holder 1 having the above-described configuration is assembled, as illustrated in FIGS. 3, 5, the three electric wires 11 are situated between the lower member 1A and the upper member 1B, and the lower member 1A (or the upper member 1B) is moved close to each other so as to bring the lower side split surface 10A and the upper side split surface 10B into proximity with each other.

As the movement proceeds, the tip of the right-side lock piece 81A of the first electric wire insertion portion 3A comes into contact with the right-side contact surface of the right-side lock receiving-portion 82A, and as the movement further proceeds, the right-side lock piece 81A is situated between the first front side overhang portion 84 and the first rear side overhang portion 85. As a result, the right-side lock piece 81A becomes immovable in the longitudinal direction X between the first front side overhang portion 84 and the first rear side overhang portion 85, and the right-side lock piece 81A locks to the right-side lock receiving-portion 82A.

As the movement proceeds, the tip of the left-side lock piece 91A of the first electric wire insertion portion 3A comes into contact with the left-side contact surface 93 of the left-side lock receiving-portion 92A, and as the movement further proceeds, the left-side lock piece 91A is situated between the second front side overhang portion 94 and the second rear side overhang portion 95. As a result, the left-side lock piece 91A becomes immovable in the longitudinal direction X between the second front side overhang portion 94 and the second rear side overhang portion 95, and the left-side lock piece 91A locks to the left-side lock receiving-portion 92A.

Furthermore, like the first electric wire insertion portion 3A, the second electric wire insertion portion 3B is such that the tip of the right-side lock piece 81B of the second electric wire insertion portion 3B comes into contact with the right-side contact surface of the right-side lock receiving-portion 82B so that the right-side lock piece 81B locks to the right-side lock receiving-portion 82B, and the tip of the left-side lock piece 91B comes into contact with the left-side contact surface 93 of the left-side lock receiving-portion 92B so that the left-side lock piece 91B locks to the left-side lock receiving-portion 92B.

Furthermore, like the first electric wire insertion portion 3A, the third electric wire insertion portion 3C is such that the tip of the right-side lock piece 81C of the third electric wire insertion portion 3C comes into contact with the right-side contact surface of the right-side lock receiving-portion 82C so that the right-side lock piece 81C locks to the right-side lock receiving-portion 82C, and the tip of the left-side lock piece 91C comes into contact with the left-side contact surface 93 of the left-side lock receiving-portion 92C so that the left-side lock piece 91C locks to the left-side lock receiving-portion 92C.

As a result, each electric wire 11 is sandwiched in the up-and-down direction between the upper side insertion portion 7 and the lower side insertion portion 6. In this manner the electric wire insertion portions 3A, 3B, 3C (3) are assembled, and the rear holder 1 in which the three electric wires 11 are supported is assembled.

When the rear holder 1 is attached to the connector housing, the rear holder 1 comes close to the connector housing in such a state that the three electric wires 11 are inserted through the inside of the connector housing and the rear holder 1 is situated on the rear side X2 of the connector housing, and the lower member 1A and the upper member 1B are assembled and attached to the connector housing simultaneously. In this manner, the rear holder 1 is attached to the connector housing.

According to the above-described embodiment, the lock portions 8A, 8B, 8C (8), 9A, 9B, 9C (9) for attaching the lower side insertion portion 6 (first insertion portion) and the upper side insertion portion 7 (second insertion portion) to each other are provided, and the lock portions 8, 9 include lock pieces 81A (91A), 91B (81B), 81C (91C) protruding from one of the lower side insertion portion 6 and the upper side insertion portion 7 to the other thereof, and lock receiving-portions 82A (92A), 92B (82B), 82C (92C) provided on the other of the lower side insertion portion 6 and the upper side insertion portion 7 to lock the lock pieces 81A (91A), 91B (81B), 81C (91C) immovably in the longitudinal direction X (direction in which the electric wires 11 extend), so that even if a local load is applied to only one of the lower member 1A and the upper member 1B (the two members), the lower member 1A and the upper member 1B are restricted from displacing relatively in the longitudinal direction X, and the lower member 1A and the upper member 1B are assembled and attached to the connector housing simultaneously. Therefore, when attached to the connector housing, it can be prevented to attach only one of the lower member 1A and the upper member 1B to the connector housing, so that ease of attachment to the connector housing is improved.

Furthermore, the lock portions 8, 9 include the lock piece 81A (91A), 91B (81B), 81C (91C) protruding from one of the lower side insertion portion 6 and the upper side insertion portion 7 to the other thereof, and the lock receiving-portions 82A (92A), 92B (82B), 82C (92C) provided on the other of the lower side insertion portion 6 and the upper side insertion portion 7 to lock the lock pieces 81A (91A), 91B (81B), 81C (91C) immovably in the longitudinal direction X (direction in which the electric wires 11 extend), so that even if a local load is applied to only one of the lower member 1A and the upper member 1B (the two members), the load is transmitted from the lock pieces 81A (91A), 91B (81B), 81C (91C) to the lock receiving-portions 82A (92A), 92B (82B), 82C (92C) and is dispersed throughout the entirety of the lower member 1A and the upper member 1B, so that the strength against pull-out load is improved.

Furthermore, the electric wire insertion portion 3A, 3 includes the pair of lock portions 8A, 9A, and the lock portion 8A from among (one of) the pair of lock portions 8A, 9A is such that the lock piece 81A is provided on the lower side insertion portion 6 from among (one of) the lower side insertion portion 6 (first insertion portion) and the upper side insertion portion 7 (second insertion portion), and the lock receiving-portion 82A is provided on the upper side insertion portion 7 from among (the other of) the lower side insertion portion 6 and the upper side insertion portion 7, and the lock portion 9A from among (the other of) the pair of lock portions 8A, 9A is such that the lock piece 91A is provided on the upper side insertion portion 7 from among (the other of) the lower side insertion portion 6 and the upper side insertion portion 7, and the lock receiving-portion 92A is provided on the lower side insertion portion 6 from among (one of) the lower side insertion portion 6 and the upper side insertion portion 7.

Furthermore, the electric wire insertion portion 3B, 3 includes the pair of lock portions 8B, 9B, and the lock portion 8B from among (one of) the pair of lock portions 8B, 9B is such that the lock piece 91B is provided on the lower side insertion portion 6 from among (one of) the lower side insertion portion 6 (first insertion portion) and the upper side insertion portion 7 (second insertion portion), and the lock receiving-portion 92B is provided on the upper side insertion portion 7 from among (the other of) the lower side insertion portion 6 and the upper side insertion portion 7, and the lock portion 9B from among (the other of) the pair of lock portions 8B, 9B is such that the lock piece 81B is provided on the upper side insertion portion 7 from among (the other of) the lower side insertion portion 6 and the upper side insertion portion 7, and the lock receiving-portion 82B is provided on the lower side insertion portion 6 from among (one of) the lower side insertion portion 6 and the upper side insertion portion 7.

Furthermore, the electric wire insertion portion 3C, 3 includes the pair of lock portions 8C, 9C, and the lock portion 8C from among (one of) the pair of lock portions 8C, 9C is such that the lock piece 81C is provided on the lower side insertion portion 6 from among (one of) the lower side insertion portion 6 (first insertion portion) and the upper side insertion portion 7 (second insertion portion), and the lock receiving-portion 82C is provided on the upper side insertion portion 7 from among (the other of) the lower side insertion portion 6 and the upper side insertion portion 7, and the lock portion 9C from among (the other of) the pair of lock portions 8C, 9C is such that the lock piece 91C is provided on the upper side insertion portion 7 from among (the other of) the lower side insertion portion 6 and the upper side insertion portion 7, and the lock receiving-portion 92C is provided on the lower side insertion portion 6 from among (one of) the lower side insertion portion 6 and the upper side insertion portion 7. Therefore, so that even if a local load is applied to only one of the lower member 1A and the upper member 1B (the two members), the load can be more fully dispersed throughout the entirety of the lower member 1A and the upper member 1B.

Furthermore, the lock pieces 81A, 91B, 91A, 81B and the lock receiving-portion 82A, 92B, 92A, 82B of the pair of adjacent electric wire insertion portions 3A, 3B from among the multiple electric wire insertion portions 3A, 3B, 3C are provided in a reversed manner with respect to the axis P1 that is the up-and-down direction Z (direction in which the first insertion portion and the second insertion portion attach to each other). The lock pieces 81B, 91C, 91B, 81C and the lock receiving-portions 82B, 92C, 92B, 82C of the pair of adjacent electric wire insertion portions 3B, 3C from among the multiple electric wire insertion portions 3A, 3B, 3C are provided in a reversed manner with respect to the axis P2 that is the up-and-down direction Z (direction in which the first insertion portion and the second insertion portion attach to each other). Therefore, the lower member 1A and the upper member 1B can be attached more firmly.

Note that the present invention is not limited to the embodiment, but includes other configurations that can achieve the object of the present invention, and the present invention also includes the following modifications.

In the embodiment, the rear holder 1 includes the three electric wire insertion portions 3A, 3B, 3C (3), but the present invention is not limited thereto. The rear holder 1 may include two or more electric wire insertion portions, and may include four or more electric wire insertion portions.

Furthermore, the best configuration, method, and the like for carrying out the present invention have been disclosed in the above description, but the present invention is not limited thereto. That is, although the present invention has been particularly illustrated and described primarily with respect to the specific embodiment, a person skilled in the art would be able to make various modifications to the embodiment described above in terms of shape, material, quantity, and other detailed configurations, without deviating from the scope of the technical idea and purpose of the present invention. Therefore, recitations that limit the shape, material, and the like disclosed above are provided as examples to facilitate understanding of the present invention, and are not intended to limit the present invention. Accordingly, recitations of names of members that exclude some or all of the limitations such as a shape, material, and the like are included in the present invention.

LIST OF REFERENCE SIGNS 1 rear holder (electric wire holder)
3A, 3 first electric wire insertion portion (electric wire insertion portion)
3B, 3 second electric wire insertion portion (electric wire insertion portion)
3C, 3 third electric wire insertion portion (electric wire insertion portion)
6 lower side insertion portion (first insertion portion)
7 upper side insertion portion (second insertion portion)
8,9 lock portion
81A, 81B, 81C right-side lock piece (lock piece)
91A, 91B, 91C left-side lock piece (lock piece)
82A, 82B, 82C right-side lock receiving-portion (lock receiving-portion)
92A, 92B, 92C left-side lock receiving-portion (lock receiving-portion)
11 a plurality of electric wires
P1, P2 axis

What is claimed is:

1. An electric wire holder configured to be attached to an end portion of a tubular-shaped connector housing through which a plurality of electric wires is inserted to support the electric wires,
   wherein the electric wire holder includes two members including a tubular-shaped electric wire insertion portion through which an electric wire, of the electric wires, is inserted, the two members being capable of sandwiching the electric wire,
   the electric wire insertion portion includes:
     a first insertion portion in a C shape and provided on one of the two members;
     a second insertion portion in a C shape provided on the other of the two members; and
     a lock portion configured to attach the first insertion portion and the second insertion portion to each other,
   the lock portion includes:
     a lock piece protruding from one of the first insertion portion and the second insertion portion to the other of the first insertion portion and the second insertion portion; and
     a lock receiving-portion provided on the other of the first insertion portion and the second insertion portion to lock the lock piece immovably in a direction in which the electric wire extends,
   wherein the electric wire insertion portion includes a pair of lock portions,
   one of the pair of lock portions is configured such that the lock piece is provided on the one of the first insertion portion and the second insertion portion, and the lock receiving-portion is provided on the other of the first insertion portion and the second insertion portion,
   the other of the pair of lock portions is configured such that the lock piece is provided on the other of the first insertion portion and the second insertion portion, and the lock receiving-portion is provided on the one of the first insertion portion and the second insertion portion,
   wherein a plurality of electric wire insertion portions is provided,
   the lock pieces and the lock receiving-portions of a pair of adjacent electric wire insertion portions among the plurality of electric wire insertion portions are provided in a reversed manner with respect to an axis that is a direction in which the first insertion portion and the second insertion portion attach to each other.

* * * * *